US008031672B2

(12) United States Patent
Balaji et al.

(10) Patent No.: US 8,031,672 B2
(45) Date of Patent: Oct. 4, 2011

(54) SYSTEM AND METHOD FOR PROVIDING SECURE MOBILITY AND INTERNET PROTOCOL SECURITY RELATED SERVICES TO A MOBILE NODE ROAMING IN A FOREIGN NETWORK

(75) Inventors: Holur Balaji, Bangalore (IN); Vaidya Rahul, Bangalore (IN); Rajadurai Rajavelsamy, Bangalore (IN); Jeedigunta Venkateswar, Bangalore (IN); O-Sok Song, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 900 days.

(21) Appl. No.: 11/794,436

(22) PCT Filed: Dec. 27, 2005

(86) PCT No.: PCT/KR2005/004582
§ 371 (c)(1),
(2), (4) Date: Dec. 18, 2007

(87) PCT Pub. No.: WO2006/071055
PCT Pub. Date: Jul. 6, 2006

(65) Prior Publication Data
US 2008/0219224 A1    Sep. 11, 2008

(30) Foreign Application Priority Data
Dec. 28, 2004   (IN) .......................... 1443/CHE/2004

(51) Int. Cl.
H04W 4/00    (2009.01)

(52) U.S. Cl. ...................................................... 370/331
(58) Field of Classification Search .................. 370/331
See application file for complete search history.

(56) References Cited

U.S. PATENT DOCUMENTS

| | | | |
|---|---|---|---|
| 6,795,857 B1 * | 9/2004 | Leung et al. .................. 709/224 |
| 6,839,338 B1 * | 1/2005 | Amara et al. ................. 370/338 |
| 7,061,887 B2 * | 6/2006 | Fan ............... 370/331 |
| 7,616,597 B2 * | 11/2009 | Liu et al. ...................... 370/328 |
| 2002/0091921 A1 | 7/2002 | Kunzinger | |
| 2002/0143993 A1 | 10/2002 | Jung | |
| 2004/0252653 A1 | 12/2004 | Shimizu et al. | |
| 2005/0163078 A1 * | 7/2005 | Oba et al. ...................... 370/331 |
| 2005/0195780 A1 * | 9/2005 | Haverinen et al. ........... 370/338 |
| 2006/0104252 A1 * | 5/2006 | Song et al. .................... 370/338 |

* cited by examiner

Primary Examiner — Derrick Ferris
Assistant Examiner — Mang Yeung
(74) Attorney, Agent, or Firm — The Farrell Law Firm, P.C.

(57) ABSTRACT

A method for connection roaming a Mobile Node (MN) to a Network GateWay (NGW) for providing secure data path using Internet Protocol (IP) security procedure. Also Mobile IP (MIP) is required for providing mobility to the user, when the MN moves from one sub-network to another. However, when the Home Address of the network is not known, a cyclic interdependency is observed between the IP Security (Ipsec) procedures and IP procedures. If the home address of the MN is not known initially during the procedure, IPsec Security Associations (SA's) are formed between the MN and NGW such that only IP packets are passed through. After the IP Registration is completed, the Home Address of the MN is known from the MIP registration Reply. MN now forms a data path tunnel with the NGW by exchanging Create_Child_SA messages.

11 Claims, 4 Drawing Sheets

SYSTEM AND METHOD FOR PROVIDING SECURE MOBILITY AND INTERNET PROTOCOL SECURITY RELATED SERVICES TO A MOBILE NODE ROAMING IN A FOREIGN NETWORK

BACKGROUND OF THE INVENTION

1. Field of the Invention

This invention relates to the field of mobile communication, and in particular, to providing mobility services and Internet Protocol related security services simultaneously to a mobile node, which is roaming outside the Home Network. More specifically, this invention provides a system and method to break the cyclic interdependency between Internet Protocol (IP) security messages and Mobile IP messages when the Home Address of the Mobile Node is not known.

2. Description of the Related Art

In a scenario where the Mobile Node roams into a foreign network that does not provide adequate over the air security, it is to be noted that the NGW is a trusted entity, either in the foreign network or in the home network, and hence provides secure path to any node in the home network. Thus, to provide a secure communication channel between the Mobile Node and the home network, it is possible to form an IP security tunnel between the Mobile Node and the NGW. The present invention makes the Mobile Node capable of roaming, while keeping the sessions alive, and also provides security to Mobile IP messages even when the Home Address of the Mobile Node is not known.

Currently in the above scenario, it is not possible to provide Internet Protocol Security (IPse) and mobility related scenarios if the Home Address of the Mobile Node is unknown. This is because the IP security tunnel formation requires the Remote IP Address (Home Address), which is obtained in successful Mobile IP Registration Reply from the Home Agent. There is a cyclic interdependency which prevents the network from providing the Mobile Node with Security and Mobility related services simultaneously. However, for Mobile IP (MIP) Registration Signaling, formation of the tunnel is necessary.

In the light of the foregoing, there is a need for a method and system for breaking the cyclic interdependency between Mobile IP and IP security.

The present invention is related to a system that needs to form an IP security tunnel with the foreign entity Network GateWay (NGW). The system for the invention present (as shown in FIG. 1) includes a Mobile Node (MN) capable of roaming in foreign networks, an NGW, a Foreign Agent (FA) in the foreign network, and a Home Agent (HA) in home network. In present invention, if is assumed that the NGW and the FA are collocated. The Mobile Node also requires performing the Mobile IP registration for mobility services with Foreign Agent and Home Agent. The present invention provides a mechanism for the case where a Home Address of the Mobile Node is not known when it is in the foreign network.

When the Mobile Node (MN) roams in a foreign network, the Mobile Node forms a tunnel with the Network GateWay (NGW) to obtain Packet Services provided by the network. This can be done for example, to provide secure access over an untrusted interface (e.g. an air interface with inadequate security). The local network can provide an IP address to the Mobile Node (Local IP Address routable only up to NGW) while the remote IP address, through which the Mobile Node is accessible to outside world, is to be provided by the external network to which the MN is trying to reach for the service (in this case we assume home network obtains the IP address from the external network and sends it to the Mobile Node). The scenario is depicted in FIG. 1.

Mobile IP is used for providing mobility services when a Mobile Node roams from one (sub) network to another (sub) network. Mobile IPv4 (Internet Protocol version 4) requires a node in the foreign network acting as a foreign agent, and a node in home agent acting as a Home Agent. When a mobile node roams into a foreign network, it sends a registration request through the Foreign Agent to the Home Agent, indicating that it is available at the given IP address.

When the Mobile Node requires a new service, the following procedure is carried out for the establishment of the tunnel between the MN and the Packet Data Gateway (PDG), as shown in the FIG. 3

1. The IP address of the NGW, which provides the service, is obtained. Then Internet Key Exchange Protocol version 2 (IKEv2) messaging is carried out between the Mobile Node and the NGW (with optional authentication). At the end of the IKEv2 signaling a tunnel is formed between the Mobile Node and the NGW that acts as a data path.
2. Once the tunnel is formed, a Mobile IP Registration request is sent to the Home Agent through FA (Foreign Agent). Then HA sends the Registration reply. If successful, the MN can now securely receive packets sent to it, even when the MN roams in different foreign networks. The message flow/sequence is shown in FIG. 3.

The method of the present invention includes mechanisms for forming a dummy Security Association (SA) when the Home Address of the MN is not known such that only Mobile IP messages are allowed to pass through, making the MIP registration with the Home Agent, and creating the final SA with the NGW when the Home Address is obtained from the MIP Registration Reply, if successful, by creating a child SA.

SUMMARY OF THE INVENTION

It is therefore the primary object of the invention is to provide a system and method for facilitating secure mobility to a mobile node roaming in a foreign network system and whose home address is not known.

It is another object of the invention to break the cyclic interdependency between Mobile IP and IP security so as to enable Mobile IP Registration Signaling and formation of the tunnel.

It is yet another object of the invention to illustrate features in a 3G-WLAN interlocking scenario.

It is also an object of the invention to define Traffic Selectors and other IKE parameters used during the procedure.

Accordingly, the present invention provides a method, which would solve the problems associated with current art, as described below.

1. The Mobile Node forms the tunnel with NGW. (We assume IKEv2 is used to form the secure tunnel here, but the secure tunnel can be formed by any other mechanism). The IKE message includes a Traffic Selector Initiator (TSi) as any IP-address (i.e. full range of IP addresses from 0.0.0.0 to 255.255.255.255) and a random port. A Traffic Selector Responder (TSr) is an IP Source address of a Foreign Agent from which an agent advertisement (in the case where the NGW and FA are collocated, TSr contains the NGW IP address and port 434) was sent and the port number is 434 (standard Mobile IP port). The protocol used is User Datagram Protocol (UDP).
2. The MIP messages can now be sent through the tunnel and will be passed on the Home Agent. If the MIP registration is successful, the MIP Registration Reply contains the Home Address of the Mobile Node. The mobile node can extract it from the message.

3. Mobile Node now sends the Create_Child_SA (Security Association) message (of IKEv2) to create the actual SA with the NGW using the remote IP address (Home IP Address).

The objective herein is to create a dummy SA that encrypts all the traffic going out of the Mobile Node to the NGW. Only the Mobile IP (MIP) traffic is allowed through the established tunnel initially as the destination port in the SA is a set to 434 (or any port on which the MIP application is listening to), which is a standard MIP port. However, if two MNs start the initialization process simultaneously, only one of them can proceed as the TS Initiator (TSi). However, since the port of the MIP is randomized, the probability of one reply being transmitted to the other MN is negligible.

Accordingly, the present invention includes a method for establishing mobility and Internet Protocol security related services by a Mobile Node roaming in a foreign network when the Home Address of the Mobile Node is not known, the including forming a secure dummy tunnel with the network gateway for mobile IP passage; sending the mobile IP messages for registration through the thus formed tunnel to the home agent; extracting the home address from the successful registration reply message; and ending a message to create the actual security association with network gateway using the Home IP address to form a data path.

Accordingly, the present invention further includes a system for establishing mobility and Internet Protocol security related services by a Mobile Node roaming in a foreign network when the Home Address of the Mobile Node is not known.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EXEMPLARY EMBODIMENTS

Figure 1:
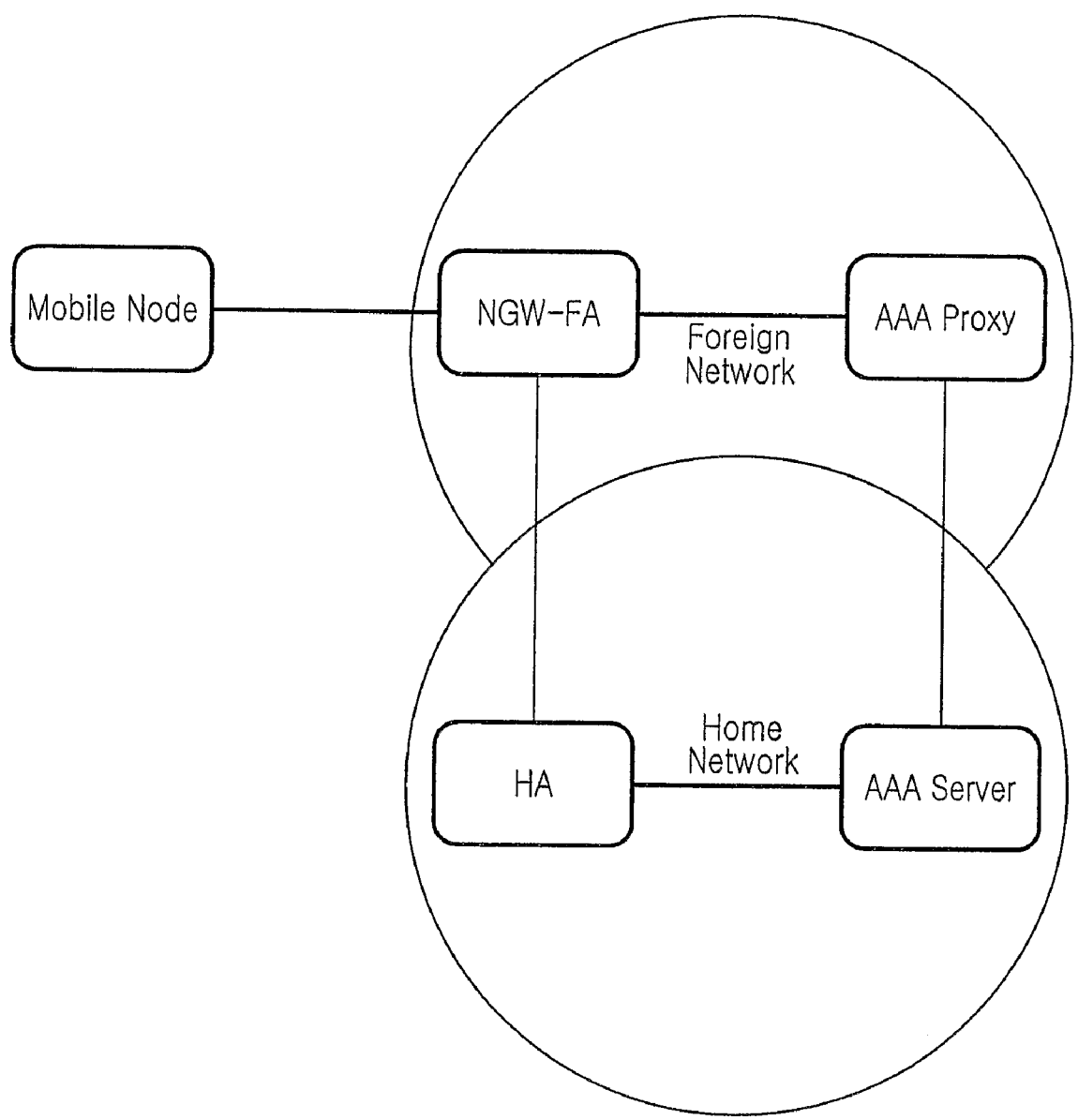
FIG. 1 illustrates the different network elements of the system considered in the invention.

A preferred embodiment of the present invention will now be explained with reference to the accompanying drawings. It should be understood however that the disclosed embodiment is merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The present invention provides a system and method for providing IPsec and mobility services to a Mobile Node (MN) when the Home Address of the MN is not known and the MN is in a foreign network.

The procedure for establishing the tunnel connection is as follows. A is Mobile Node connects to an external IP network through a Network GateWay (NGW) and the MN initiates a Tunnel Establishment Request towards the NGW. The MN should create an actual Security Association (SA) with the NGW when the Mobile IP registration is successfully completed and the Home Address is extracted from the Mobile Internet Protocol (MIP) message.

Functions of the NGW include:

Obtaining the MN information from the tunnel establishment request; and

Passing the obtained information to an Authentication, Authorization, and Accounting Server (AAA-Server) (to which MN is attached) for authentication and authorization (Optional).

The NGW also consists of a Foreign Agent (FA) functionality, in this case, as it is assumed that the NGW and the FA are collocated.

Functions of the Mobile Node include:

Identification of the NGW for particular service;

Initiation of a Tunnel establishment procedure towards the NGW; and

Creation of the actual SA with the NGW when the Home Address of the Mobile Node is known.

1. When a Mobile Node needs to access a service provided by the network, it needs to form a secure tunnel with a NGW, which can provide the service. The IP address of the NGW can be found by a Domain Name Server (DNS) query or by some other means.

2. The MN initiates a tunnel establishment request with the NGW. As a part of the tunnel establishment, the user can be authenticated and authorized for the service. At the end of this procedure the tunnel is formed between Mobile Node and NGW. The traffic selectors on the MN for an 'out' direction are as follows: a Source IP address is any IP address (i.e. from 0.00.0 to 255.255.255.255), a Port is a randomly chosen port for the MN. The Destination IP address is the IP address of the FA through which the Agent Advertisement was sent (in this illustrative case it is same as a Packet Data Gateway (PDG) address obtained in step 1), the port is 434 (or any other port on which Mobile IP application is listening) and the upper layer protocol is UDP.

3. Hence now all IP packets for Mobile IP signaling can pass through the tunnel, since the destination port open is the only MIP port. All other packets are dropped.

4. [Optional] A Mobile Agent Solicitation and an Advertisement can be exchanged.

5. The Mobile IP Registration Request message is passed through the tunnel. It is normally processed at the FA and forwarded to the HA or the AAA (to AAA infrastructure in the case when either Home Agent address or Home Agent subnet is not known). In the case where the Home Agent address is not known, the processing of Mobile IP Registration Request contains the MN-AAA authentication extension, MN-HA Keygen nonce request (according to an Internet Engineering TaskForce (IETF) Internet draft "AAA Registration Keys for Mobile IPv4" draft-ietf-mip4-aaa-key-*.txt). The HA sends the Mobile IP Registration Reply and Home Address is contained if successful.

6. On receiving the Registration Reply, Mobile Node extracts the Home Address. Now the MN creates a new SA between the Mobile Node and the NGW with the Home IP address. Thus a data path to the network is created.

Figure 4:
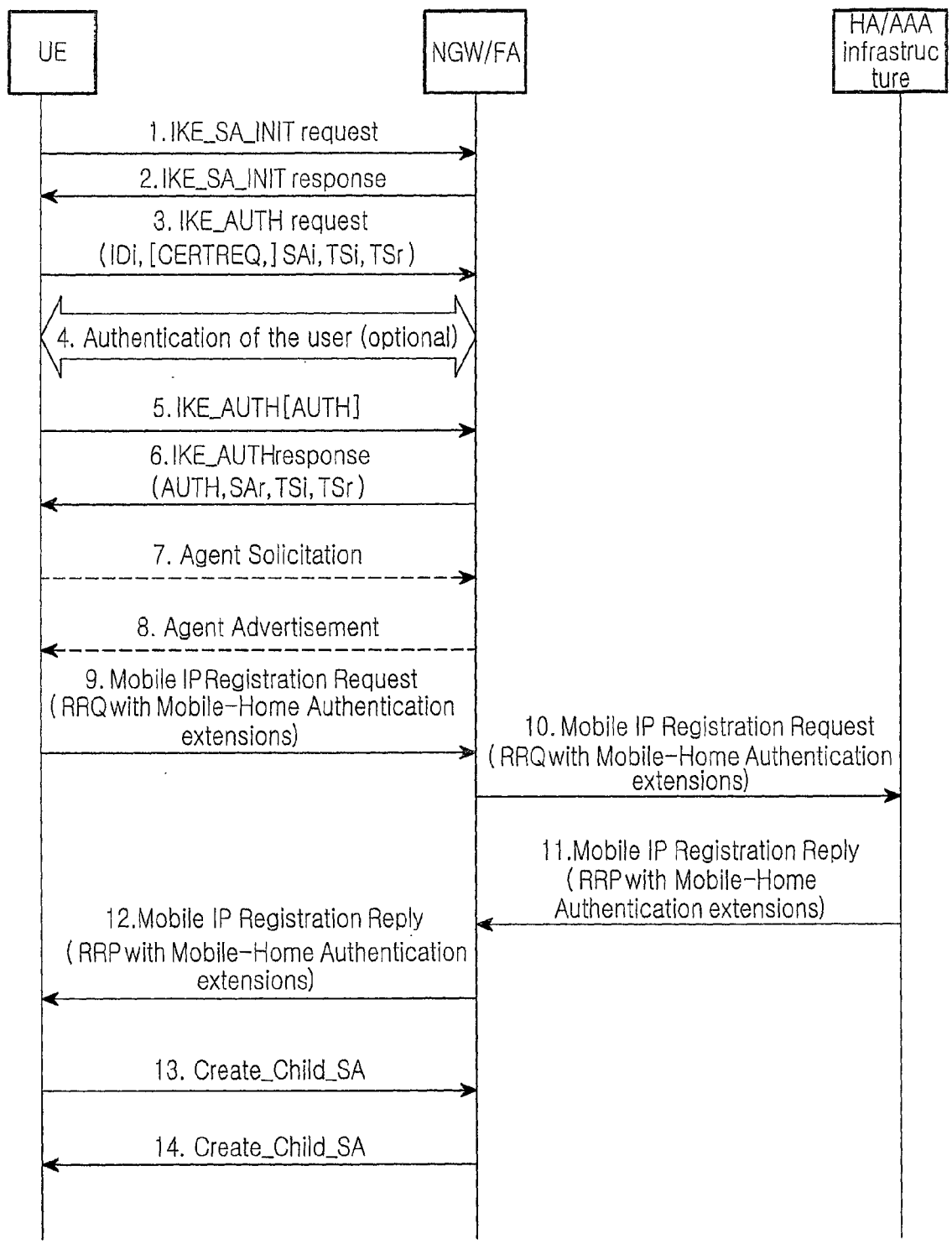

An illustrative example for operating the invention is now presented. in a to scenario where an MN is roaming in a foreign network. The MN needs to connect through IPsec to the trusted node NGW that can be either in foreign network or in home network. The NGW also acts as the Foreign Agent (FA) to the MN. The message flow sequence is as depicted in FIG. 4.

Figure 2:
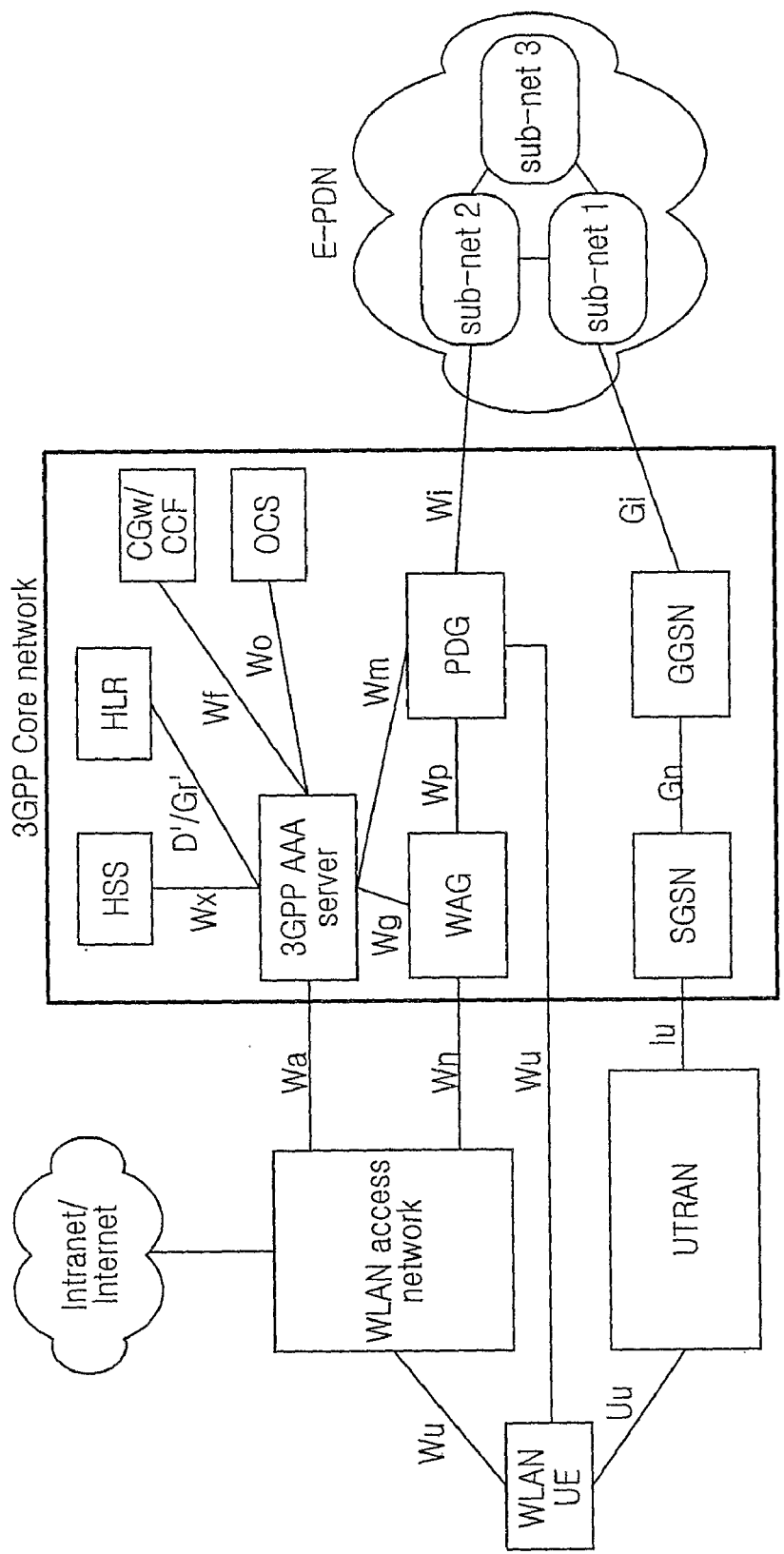
FIG. 2 illustrates the 3G-WLAN interworking system architecture to which the invention applied.
Figure 3:
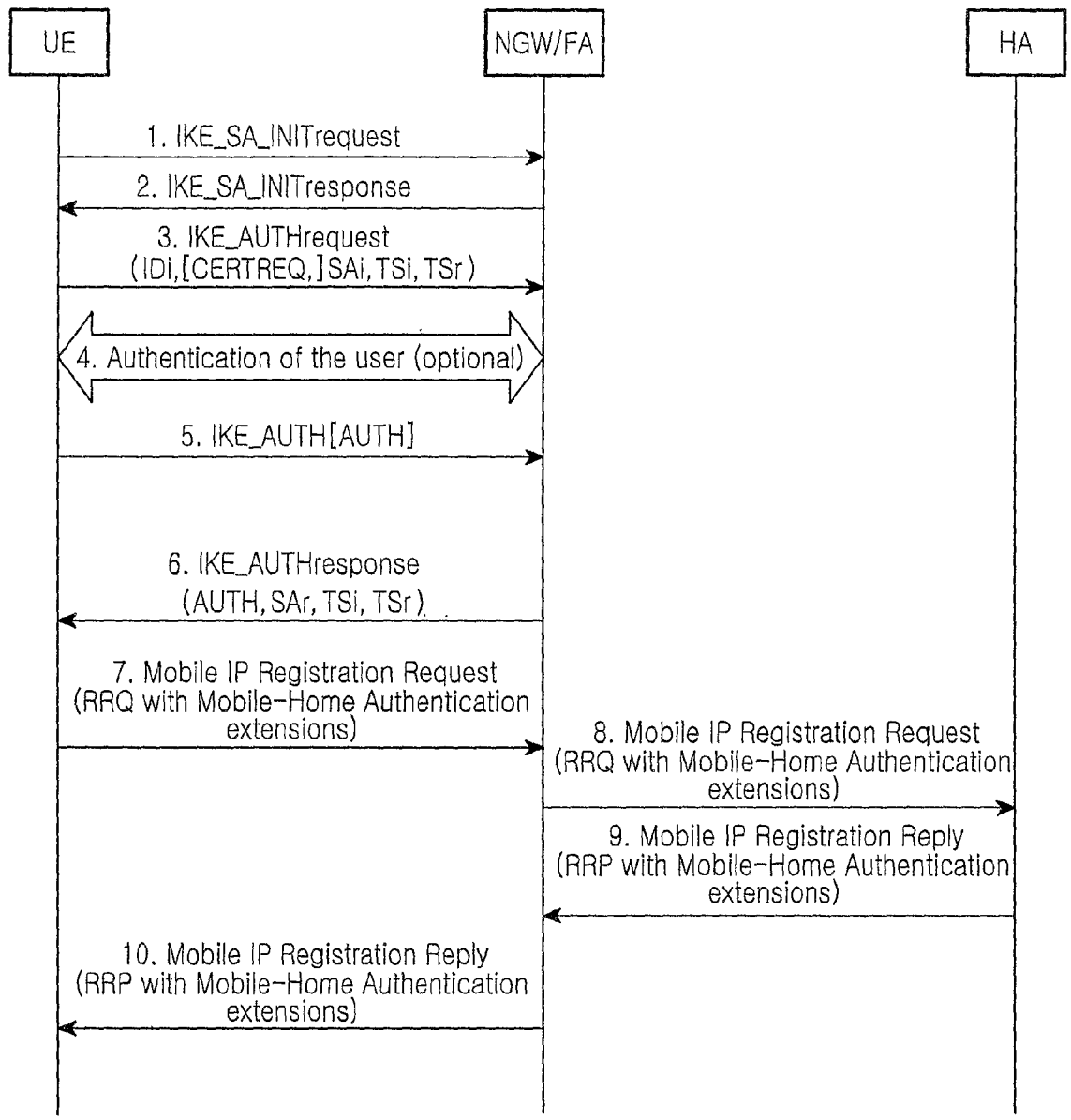
FIG. 3 illustrates the sequence for establishing of the IP security tunnel and Mobile IP registration according to the prior art when the Home Address of the MN is known and FIG. 4 illustrates the sequence for establishing the IP sec tunnel and MIP registration according to the invention when the Home Address is not known.

For a comparison between the above mentioned system and a Wireless Local Area Network 3$^{rd}$ Generation (3G-WLAN) interworking system (http://www.3gpp.org), the PDG acts as a Network Gateway which resides either in the foreign network or in the home network. The 3G-WLAN system is shown in FIG. 2. and includes:

1. WLAN-UE—to initiate the tunnel;
2. WLAN—For relaying of the EAP signaling between the Home Network and the WLAN UE;
3. PDG: The end-point of the tunnel; and
4. AAA Server—is the authenticator which authenticates/authorizes the UE/user.

The Home Agent is assumed to be collocated with a Gateway General Packet Radio Service (GPRS) Support Node (GGSN) of the 3G network for the sake of simplicity, although it is not necessary for this invention to work. The scenario considered here is when the WLAN UE needs to access some service. The User Equipment (UE) does not know the Home Address and the Home Agent Address.

The following steps briefly explain the operation of the system shown in FIG. 4:

1 and 2. The UE and the NGW negotiate IKE_SA.
3. The UE sends an IKE_AUTH request. If the user is to be authenticated and/or authorised it does not include an AUTH payload to the NGW. This initiates the authentication procedure. The Identification Initiator (Idi) payload in the IKE_AUTH request must contain a Network Address Identifier (NkAI) of the MN. Optionally, the MN can attach a CERTificate REQuest (CERTREQ) payload to the IKE_AUTH request if it wants to authenticate the NGW using signature-based authentication. The TSi payload contains 0.0.0.0/0 (indicating full range of IP address from 0.0.0.0 to 255.255.255.255) and a random port through which Mobile IP messages are to be sent. TSr contains the source IP address of the packet containing the Agent Advertisement and the port 434 (or any other predetermined port on which Mobile IP application listens for messages).
4. Authentication and/or Authorization can be carried out between the backend authentication server. If the authentication/authorization is successful, the following steps are carried out.
5. The MN sends an IKE_AUTH message, which contains the AUTH payload. The MN can use a shared secret, which could be derived during the previous authentication/authorization step.
6. The NGW sends an IKE_AUTH response that contains the AUTH payload. The NGW calculates the AUTH payload with the shared secret derived during the authentication or any other method.
7. [Optional] The MN sends an Agent Solicitation message through the same tunnel. In the 3G-WLAN case, the filtering policy in a Wireless Access Gateway (WAG) needs to be changed so that packets from the UE to an All Agent Multicast can be allowed. If the routing policy does not allow the All Agent Multicast packets from the UE to the NGW, an Serving Profile Database (SPD) at the UE and the PDG will contain another entry which will encapsulate all Internet Control Message Protocol (ICMP) packets to the All Agent Multicast address so that packets can pass through the WAG.
8. [Optional] The FA sends the Agent Advertisement message in response to the Agent Solicitation.
9. The MN sends a MIP_Registration_Req [NAI, MN-HA-Keygen-Nonce-Request, MN-AAA auth ext] with the Home Address as 0.0.0.0. The source IP address of the packet is 0.0.0.0 and the destination is the FA IP address (which is same as PDG IP address). Hence the packet is tunneled to the PDG.
10. The FA sends the MIP-Registration-Request to Home Agent, when the Home Agent IP address is known. When the Home Agent is not known, the request is sent to an AAA infrastructure in an appropriate AAA message format (According to IETF draft [2]). AAA server, after authenticating the MN, generates keys as requested in registration message, and distributes to the respective agents. FA can then forward the Registration Request to the HA, if it has not relayed it earlier. HA then sends the Registration Reply to the FA.
11. The MIP Registration reply is transmitted to the FA either by the HA or indirectly by the AAA server.
12. NGW forwards an MIP_REG_REPLY message to the MN through the established dummy tunnel.
13. MN obtains the Home Address from the MIP_REG_REPLY. Sends CREATE_CHILD_SA request with TSi contain Home address as the IP parameter.
14. NGW Sends CREATE_CHILD_SA reply with TSi as remote IP address of MN.

As stated previously, the above procedure can be applied to the 3G-WLAN, where the Network gateway is a PDG, and an HA is collocated with a GGSN (or is in the same sub-network). The PDG IP address can be discovered in the network by using a Domain Name Server (DNS) query over a WLAN Access Point Name (W-APN).

W-APN is indicative of service required by the WLAN-UE. The DNS reply contains the list of PDGs capable of providing the given service. The user authentication is carried out by Remote Authentication Dial In User Service (RADIUS)/Diameter messages between the PDG and AAA server in the home network.

It will also be clear to those skilled in the art that other control methods and apparatuses can be derived from combinations of the various methods and apparatuses of the present invention, as taught by the description and the accompanying drawings and these shall also be considered within the scope of the present invention. Further, description of such combinations and variations is therefore omitted above. It should also be noted that the host for storing the applications include but not limited to a computer, mobile communication device, mobile server or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

What is claimed is:

1. A method for establishing mobility and Internet Protocol (IP) security related services by a Mobile Node roaming in a foreign network when a Home Address of the Mobile Node is not known, the method comprising the steps of;

forming a secure dummy tunnel with a Network GateWay (NGW) for a Mobile IP (MIP) passage;

sending mobile IP registration messages through the secure dummy tunnel to the Home Agent (HA);

extracting the Home Address from a successful registration reply message; and sending a message to create an actual Security Association (SA) with the network gateway using the Home Address to form a data path, wherein a 'CREATE_CHILD_SA message' of Internet Key Exchange Protocol version 2 (IKEv2) is used to form the actual Security Association for the data path, after obtaining the Home Address from the Mobile IP Registration Reply message.

2. The method as claimed in claim 1, wherein the secure dummy tunnel and an MIP registration are synchronously formed by breaking a cyclic interdependency between a requirement of the Security Association and the requirement of the IP Security Association between the Network Gateway and the Mobile Node for transporting Mobile IP Registration Messages.

3. The method as claimed in claim 1, wherein the Mobile Node initiates a tunnel establishment request with the Network Gateway.

4. The method as claimed in claim 1 wherein the Mobile IP messages are processed at a Foreign Agent (FA) and forwarded to the Home Agent.

5. The method as claimed in claim 4, wherein the Network Gateway relays the registration reply message to the Mobile Node through the secure dummy tunnel.

6. The method as claimed in claim 5, wherein Mobile Node extracts the Home Address from the registration reply message.

7. The method as claimed in claim 1, wherein the mobile IP registration message comprises a Network Access Identifier, a Mobile Node Home Agent key generation nonce, a Mobile Node, and authentication extensions if the Home Agent's address and home network's prefix are not known.

8. The method as claimed in claim 1, wherein the Mobile Node sends the 'CREATE_CHILD_SA' message to the Network Gateway to form an actual Security Association for the data path.

9. The method as claimed in claim 1, wherein the secure dummy tunnel is established between a Wireless Local Area Network 3rd Generation capable User Equipment (3G WLAN UE) and a Packet Data Gateway over a Wireless LAN-Third Generation Mobile System (3GWLAN) interworking system.

10. The method as claimed in claim 9 wherein the method further comprises:

sending an Internet Key Exchange Authentication (IKE_AUTH) request, without AUTH payload to initiate an Extensible Authentication Protocol (EAP) procedure by UE and Traffic Selectors so that only MIP (Mobile IP) messages are allowed to pass;

forwarding the EAP success message by Packet Data Gateway (PDG) within the Internet Key Exchange Protocol version 2 (IKEv2) message to a WLAN-3G capable User Equipment (UE) and forming a dummy tunnel with the UE by sending agreed Traffic Selectors;

Solicitation of the Mobile Agent and Advertisement exchanging within the above-formed dummy tunnel;

forwarding the MIP Reply by Packet Data Gateway to the UE through the dummy tunnel, and;

forming the actual SA modifying the existing dummy tunnel by sending the CREATE_CHILD_SA (Security Association) IKEv2 messages.

11. The method as claimed in claim 1, wherein the secure dummy tunnel is established between a 3G-WLAN UE and a Packet Data Gateway over a 3G-WLAN interworking system.

* * * * *